United States Patent
Werner et al.

(10) Patent No.: US 6,302,400 B1
(45) Date of Patent: Oct. 16, 2001

(54) BRUSH-HAIR SEAL WITH A FRONT PLATE AND A BEARING PLATE

(75) Inventors: Klemens Werner, Munich; Alfons Gail, Friedberg, both of (DE)

(73) Assignee: MTU Motoren-und Turbinen-Union München GmbH, München (DE)

(*) Notice: Subject to any disclaimer, the term of this patent is extended or adjusted under 35 U.S.C. 154(b) by 0 days.

(21) Appl. No.: 09/423,910
(22) PCT Filed: Apr. 30, 1998
(86) PCT No.: PCT/DE98/01197
  § 371 Date: Feb. 17, 2000
  § 102(e) Date: Feb. 17, 2000
(87) PCT Pub. No.: WO98/53229
  PCT Pub. Date: Nov. 26, 1998

(30) Foreign Application Priority Data

May 16, 1997 (DE) .............................................. 197 20 648

(51) Int. Cl.[7] ..................................................... F16J 15/44
(52) U.S. Cl. .............................................................. 277/355
(58) Field of Search ............................................... 277/355

(56) References Cited

U.S. PATENT DOCUMENTS

| 5,066,024 | * | 11/1991 | Reisinger et al. | 277/355 |
| 5,688,105 | * | 11/1997 | Hoffelner | 277/355 X |
| 5,794,938 | * | 8/1998 | Hofner et al. | 277/355 X |
| 5,927,721 | * | 7/1999 | Schulze et al. | 277/355 |

FOREIGN PATENT DOCUMENTS

| 39 07 614 A1 | 9/1990 | (DE) . |
| 0 043 315 | 5/1984 | (EP) . |

* cited by examiner

*Primary Examiner*—Robert J. Sandy
*Assistant Examiner*—Karlena D. Schwing
(74) *Attorney, Agent, or Firm*—Schiff Hardin & Waite

(57) ABSTRACT

A brush seal for sealing a rotor against a housing. The brush seal includes a front panel and a supporting plate attached to the housing wherein a number of bristles are disposed between the front panel and supporting plate. A seal housing that defines a fit surface is formed by cold joining the front panel and supporting plate. The front panel or the supporting plate include a beaded lip for firmly joining the front panel to the supporting plate.

8 Claims, 1 Drawing Sheet

BRUSH-HAIR SEAL WITH A FRONT PLATE AND A BEARING PLATE

BACKGROUND OF THE INVENTION

1. Field of the Invention

The invention is directed to a brush seal having a front panel or plate and a supporting or bearing plate.

2. Description of the Prior Art

Many different brush seals are known that, for example, are utilized in gas turbines in order to seal the interspace, which is between a housing and a rotor rotating at a comparatively high speed, against leakage. Given such seals, the ends of the bristles, which are combined to form a dense bristle packet, project beyond an inside edge of the supporting plate and thus seal the interspace, which is to be kept optimally small, between the inside edge of the supporting plate and the rotor surface. When a high differential pressure is adjacent the seal, then the supporting plate arranged at the low-pressure side supports the bristles to prevent sagging toward the low-pressure side.

For manufacturing a brush seal essentially composed of a front panel, a supporting plate and a bristle packet are arranged therebetween, welding methods were previously utilized with which, in particular, the front panel and supporting plate, which form a seal housing, are welded to one another.

Given a brush seal disclosed by European Patent Application 0 453 315, for example, the front panel, the bristle packet and the supporting plate are connected with a weld that extends over the outer circumference of the brush seal. Since the outer circumferential surface is a fitting surface and must proceed planarly and perpendicularly relative to the two outer lateral surfaces of the front panel and of the supporting plate for an exactly fitting arrangement of the brush seal with reference to the housing and to the rotor, additional processing steps, for example grinding, are necessary due to the weld. This leads to higher manufacturing costs and longer throughput times during manufacture.

It also proves disadvantageous when using the welding processes that the comparatively thin front panel and supporting plates frequently warp due to non-uniform temperature distributions.

German Patent Document No. DE 39 07 614 Al discloses a brush seal having a wire bundle held in a slotted tube, wherein the tube is held together by two supporting rings joined to form a housing by one or more clamp lips that are attached to the one supporting ring and embrace the second supporting ring at the outside to produce a clamping force. The positioning of the clamp lips ensues with a curling or rolling process. The manufacture of the two supporting rings is not disclosed, nor is the provision of a fit surface at the brush seal housing.

SUMMARY OF THE INVENTION

The invention is based on the object of creating a brush seal whose seal housing can be simply manufactured in fabrication-oriented terms, i.e. with optimally few processing procedures.

This yields the advantage that the seal housing is manufactured without the application of heat and no warping occurs as a consequence of different temperature distributions. The additional processing of the outer circumferential or fitting surface that is always required given welding is thus eliminated. The front panel and supporting plate are composed of deep-drawn sheet metal members that are manufactured with exact fit, so that no further processing steps are required at the fit seat.

A free end of the front panel or of the supporting plate is fashioned as a beaded lip. The free end thereby lies at a rectangular section relative to the main propagation plane of the front panel or supporting plate that is inwardly angled off upon respective formation of an outside curved edge with an outside radius R. The beaded lip thereby embraces the outside curved edge of the respectively other plate to such an extent that a rigid and reliable frictional connection of the two plates exists.

The beaded lip includes a thickness s which is reduced compared to the thickness S of the material of the front panel or supporting plate. The thickness s, just like the length l of the beaded lip, is to be selected dependent on the thickness of the material as well as on the shape of the plates, the structural height of the brushes, the bending radii, etc.

Preferably, the thickness s of the beaded lip amounts to approximately $\frac{2}{3}$ of the thickness S of the material of the front panel or supporting plate.

It is also advantageous that the arc is circular and the corresponding bending radius r is equal to 1.1 through 1.5 times the thickness S of the material of the front panel or supporting plate.

Preferably, the bending radius r is equal to the outside radius R at the outside edge of the front panel or supporting plate.

The front panel and supporting plate can be composed of sheet steel, wherein special steels can also be utilized.

The bristles or the bristle packet are preferably clamped non-positively by the cold joining of the front panel and supporting plate. As a result thereof, the bristles not only seal but a co-rotation of the bristle packet given extreme brushing of the rotor is also avoided. In order to enhance the coefficient of friction, a C-tube serving for the acceptance of the bristles or the inside surfaces of the front panel and supporting plate can, for example, be roughened, knurled or can be provided with notches.

DESCRIPTION OF THE PREFERRED EMBODIMENT

Figure 1:
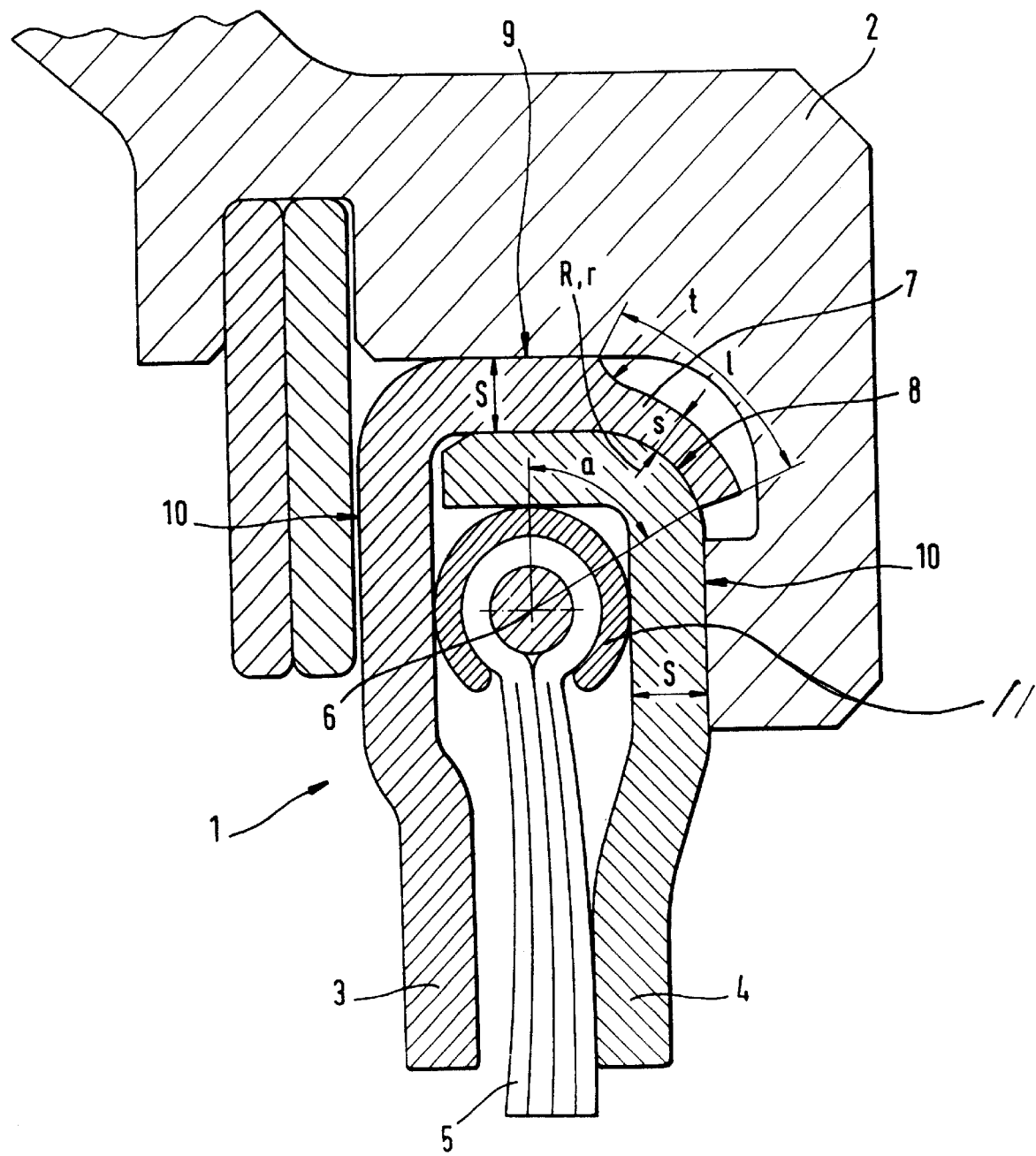
FIG. 1 shows a schematic cross sectional view of an exemplary embodiment of the inventive brush seal.

FIG. 1 shows a brush seal referenced 1 overall that is clamped in a housing 2 through which a rotor (not shown) extends. The brush seal 1 includes a housing essentially constructed of a pair of members comprising an annular front panel 3 and an annular supporting plate 4 and also includes a multitude of tightly packed bristles 5 in a slotted C-tube 11 which is firmly clamped between the front panel 3 and the supporting plate 4 at a clamping location 6.

As illustrated, the front panel 3 has a lateral surface 10 and a cylindrical flange with an outer cylindrical, circumferential surface 9. The supporting plate 4 has a cylindrical flange connected to a lateral surface 10 by an outside curved edge 8 with a radius of curvature R. The flange of the supporting plate 4 is received in the flange of the front panel 4 with the slotted tube 11 containing the bristles 5 clamped therebetween.

Given a differential pressure adjacent the brush seal 1, the front panel 3 is arranged at the high-pressure side and the supporting plate 4 is arranged at the low-pressure side. The bristles 5 clamped at one side extend between the front panel 3 and the supporting plate 4 and have their free ends remote from the clamping location 6 extending beyond inside edges of the front panel 3 and of the supporting plate 4. The ends of the bristles 5 touch the rotor surface and thus seal an annular interspace between the supporting plate 4 and the rotor.

In the present exemplary embodiment, the front panel 3 and the supporting plate 4 are a sheet material of the same thickness S. A beaded lip 7 that has a smaller thickness s is fashioned at a free end of the flange of the front panel 3 and adjoins the outer circumferential surface 9. The thickness s amounts to approximately $\frac{2}{3}$ of the thickness S of the sheet material. To form the beaded lip 7, the material is removed from the outwardly directed surface of the flange of the front panel 3.

The beaded lip 7 does not completely embrace the outside curved edge 8 of the supporting plate 4 but only embraces the curved edge in a deformation angle a in a range of approximately 60° to 90°. A rigid and firm, non-positive connection between the front panel 3 and supporting plate 4 is created with this deformation angle, and this simultaneously assures that the bristles 5 are also firmly clamped between the front panel 3 and the supporting plate 4. The bending radius r of the lip 7 is equal to the outside radius R of the outside curved edge 8, so that the beaded lip 7 conforms to the contour of the supporting plate 4 or the outside curved edge 8 thereof.

This outer circumferential surface 9 adjoining the beaded lip 7 is a fit surface that must be cylindrical for an exactly fitted attachment of the brush seal 1 between the housing 2 and the rotor, and the surface 9 must generally proceed perpendicular to the two outer lateral surfaces 10 of the front panel 3 and supporting plate 4. The thickness s, the radius r and the length l of the beaded lip 7 are therefor to be selected such that the aforementioned demands made of the fit surface 9 are met after the cold joining or working.

Although modifications and changes may be suggested by those skilled in the art, it is the intention of the inventors to embody within the patent warranted hereon all changes and modifications as reasonably and properly come within the scope of their contribution to the art.

What is claimed is:

1. A brush seal for sealing a rotor against a housing comprising a pair of members including a front panel and a supporting plate, each of said members being an annular member of a sheet material with a cylindrical flange with an outer cylindrical circumferential surface, one of the pair of members having the outer cylindrical circumferential surface being connected to the lateral surface by an outside curved edge with a radius of curvature R, the outer cylindrical circumferential surface of the other member of said pair of members forming a fitting surface for engaging in a cylindrical surface of the housing, the cylindrical flange of said other member terminating in a beaded lip having a thickness less than the thickness of the sheet material, said members being joined together with the cylindrical flange of the one member being received within the cylindrical flange of the other member and with a plurality of bristles disposed between the pair of members with the bristles having a free end extending inwardly beyond an inner edge of each of said members, said pair of members being joined together by the beaded lip extending in a circular arc of 60° to 90° and embracing the outside curved edge of said one member.

2. A brush seal according to claim 1, wherein the thickness of the beaded lip amounts to approximately $\frac{2}{3}$ of the thickness of the sheet material of the other member.

3. A brush seal according to claim 2, wherein the circular arc has a radius of curvature equal to 1.1 to 1.5 times the thickness of the sheet material of said pair of members.

4. A brush seal according to claim 3, wherein the radius of curvature of the bead is equal to the radius R of said outside curved edge of the one member.

5. A brush seal according to claim 1, wherein the cylindrical circumferential surface of the other member extends perpendicular to the outer lateral surfaces of the pair of members.

6. A brush seal according to claim 1, wherein the pair of members are composed of deep-drawn steel sheet.

7. A brush seal according to claim 1, wherein the arc of the beaded lip has a radius of curvature r equal to 1.1 to 1.5 times the thickness of the sheet material of said members.

8. A brush seal according to claim 7, wherein the radius r is equal to the radius R of the outside curved edge of said one member.

\* \* \* \* \*